United States Patent
Linebarger et al.

(10) Patent No.: US 7,035,663 B1
(45) Date of Patent: Apr. 25, 2006

(54) WIRELESS TELECOMMUNICATIONS OVERLAY SYSTEM

(75) Inventors: John W. Linebarger, Charlotte, NC (US); Durga P. Satapathy, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 793 days.

(21) Appl. No.: 10/017,929

(22) Filed: Oct. 30, 2001

(51) Int. Cl.
*H04Q 7/20* (2006.01)

(52) U.S. Cl. .............................. 455/552.1; 455/168.1; 455/443; 370/335; 370/209; 370/341

(58) Field of Classification Search ............... 455/443, 455/444, 446, 447, 449, 450, 452.1, 452.2, 455/453, 552.1; 370/335, 342, 209, 341, 370/328
See application file for complete search history.

(56) References Cited

U.S. PATENT DOCUMENTS

| | | | |
|---|---|---|---|
| 5,497,505 A * | 3/1996 | Koohgoli et al. ........ | 455/452.1 |
| 6,091,955 A * | 7/2000 | Aalto et al. .................. | 455/447 |
| 6,285,669 B1 * | 9/2001 | Gutierrez .................... | 370/335 |
| 6,405,046 B1 * | 6/2002 | Kumaran et al. ........... | 455/453 |
| 6,510,147 B1 * | 1/2003 | Sun et al. .................... | 370/335 |
| 6,778,517 B1 * | 8/2004 | Lou et al. .................... | 370/338 |
| 2003/0185163 A1 * | 10/2003 | Bertonis et al. ............. | 370/315 |

\* cited by examiner

*Primary Examiner*—Jean Gelin

(57) ABSTRACT

A system and method for overlaying signals comprises an incumbent system, an overlay system, and a multi-access controller. The incumbent system is configured to format a first signal according to a protocol used with an incumbent protocol, such as a protocol used with a multi-point multi-channel distribution service (MMDS) system, and transmits the formatted first signal as an incumbent signal to the controller. The overlay system is configured to format a second signal according to a protocol used for an overlay protocol, such as a protocol used with a code division multiple access (CDMA) system, and transmits the formatted second signal to the controller as an overlay signal. The controller overlays the incumbent signal with the overlay signal to create a wireless complementary signal and transmits the wireless complementary signal via a network.

97 Claims, 4 Drawing Sheets

WIRELESS TELECOMMUNICATIONS OVERLAY SYSTEM

RELATED APPLICATIONS

The present application is related to co-pending and commonly owned U.S. patent application Ser. No. 10/077,149, entitled Telecommunicaions Overlay System, filed Feb. 15, 2002.

FEDERALLY SPONSORED RESEARCH OR DEVELOPMENT

Not Applicable

MICROFICHE APPENDIX

Not Applicable

FIELD OF THE INVENTION

The present invention relates to the fields of single carrier and spread spectrum wireless communications.

BACKGROUND OF THE INVENTION

Wireless communications currently are used in a number of communication systems. However, the communication systems often are limited in capacity due to limitations in the ability to place towers and other equipment and the ability to use spectrum. Typically, the equipment in a wireless communication system is used for a specific protocol or spectrum, such as personal communications service (PCS) or multichannel multipoint distribution service (MMDS). However, typically more than one protocol is not serviced by equipment in the communication system.

Some communication systems have attempted to combine different protocols and/or differing equipment to increase capacity or to deploy different services. For example, terrestrial systems exist that share spectrum with satellite systems.

However, new communication systems and methods are needed that enable using multiple wireless protocols to increase capacity, throughput, and/or improve services. The systems and methods of the present invention overlay multiple wireless protocols using dynamic channel sharing to increase capacity and throughput and to improve service delivery in a single communication system.

SUMMARY OF THE INVENTION

In one aspect, the present invention is directed to a system for generating a wireless complementary signal. The system comprises an incumbent system configured to format a first signal according to an incumbent protocol and an overlay system configured to format a second signal according to an overlay protocol. A controller is configured to overlay the first signal with the second signal to create the wireless complementary signal and to transmit the wireless complementary signal.

In another aspect, the present invention is directed to a system for generating a wireless complementary signal. The system comprises an incumbent system configured to format a first signal according to an incumbent protocol at a first transmission level and to generate the formatted first signal as an incumbent signal. The system includes an overlay system configured to format a second signal according to an overlay protocol at a second transmission level and to generate the formatted second signal as an overlay signal. The system also has a controller configured to overlay the incumbent signal with the overlay signal to create the wireless complementary signal and to transmit the wireless complementary signal. The system further includes a MAC entity configured to determine the first transmission level for the incumbent signal and the second transmission level for the overlay signal. The first transmission level is complementary to the second transmission level.

In still another aspect, the present invention is directed to a system for receiving a wireless complementary signal. The system comprises a controller configured to receive the wireless complementary signal and to transmit the wireless complementary signal, the wireless complementary signal comprising an incumbent signal portion and an overlay signal portion. The system includes an incumbent system configured to receive the wireless complementary signal from the controller and to demodulate the incumbent signal portion. The system also has an overlay system configured to receive the wireless complementary signal from the controller and to demodulate the overlay signal portion.

In yet another aspect, the present invention is directed to a method for generating a wireless complementary signal. The method comprises formatting a first signal according to an incumbent protocol using an incumbent system and formatting a second signal according to an overlay protocol using an overlay system. The method includes overlaying the first signal with the second signal using a controller to create the wireless complementary signal. The wireless complementary signal is transmitted.

In a further aspect, the present invention is directed to a method for generating a wireless complementary signal. The method comprises formatting a first signal according to an incumbent protocol at a first transmission level using an incumbent system and generating the formatted first signal as an incumbent signal. A second signal is formatted according to an overlay protocol at a second transmission level using an overlay system, and the formatted second signal is generated as an overlay signal. The incumbent signal is overlayed with the overlay signal to create the wireless complementary signal using a controller, and the wireless complementary signal is transmitted. The first transmission level for the incumbent signal and the second transmission level for the overlay signal are determined using a MAC entity. The first transmission level is complementary to the second transmission level.

In still a further aspect, the present invention is directed to a method for receiving a wireless complementary signal. The method comprises receiving a wireless complementary signal at a controller and transmitting the wireless complementary signal, the wireless complementary signal comprising an incumbent signal portion and an overlay signal portion. The wireless complementary signal is received from the controller at an incumbent system, and the incumbent signal portion is demodulated. The wireless complementary signal is received from the controller at an overlay system, and the overlay signal portion is demodulated.

DETAILED DESCRIPTION

Figure 1:
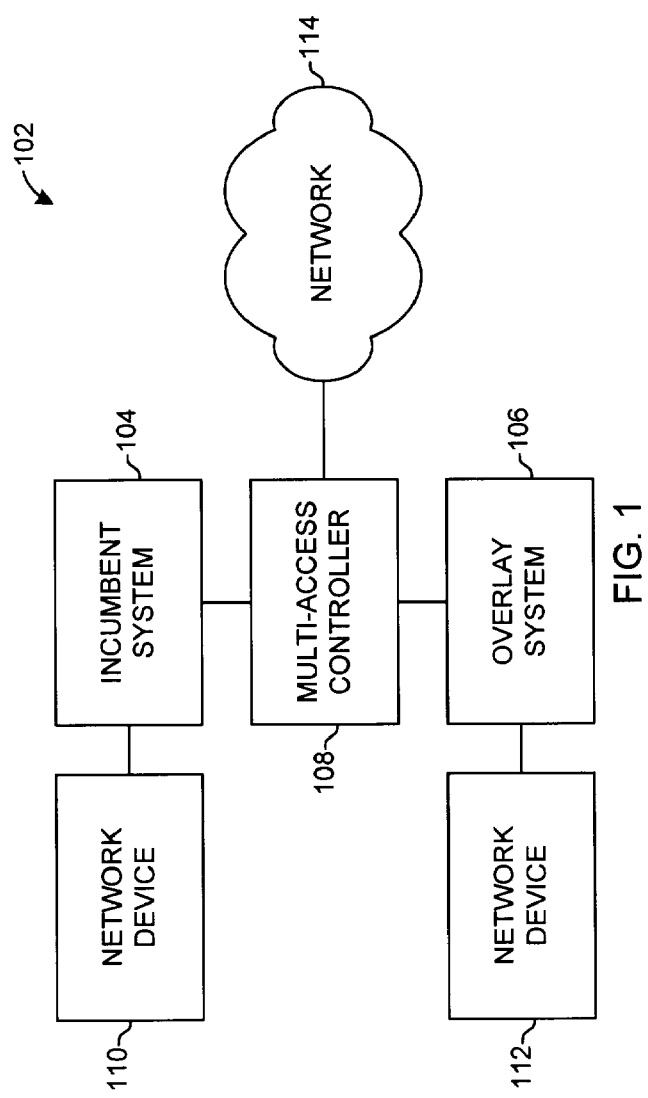
FIG. 1 is a block diagram of a communication system in accordance with an embodiment of the present invention.

Wireless communication systems often are limited in capacity due to equipment limitations and the limitations in available bandwidth for a particular wireless protocol. Improvements in modulation and compression have helped increase the capacity of wireless communication systems. In addition, improvements in equipment and the use of new protocols have increased capacity and efficiency. However, a need still exists for further throughput and efficiency, especially in geographic areas that limit the ability and/or effectiveness of the equipment to provide service through the wireless communication system.

The present invention uses an overlay of multiple wireless technologies to increase the capacity and effectiveness for communications. Preferably, a wideband system, such as code division multiple access (CDMA), is overlaid onto a narrowband single carrier system, such as multichannel multipoint distribution service (MMDS). Although, other systems may be used. The two systems dynamically share channels so that the systems retain acceptable performance.

The present invention enables a service provider to build an infrastructure using multiple systems with a reduction of total equipment, such as towers, used. Alternately, the present invention enables additional systems to be deployed by a service provider using existing infrastructures, such as existing towers. In addition, selection of a specific protocol or equipment to be used for short-term and future deployment phases can be optimized by using a first system for short-term or first service deployment and a second system for additional or expanded services for a future or second deployment. Other methods and deployments may be used.

The present invention facilitates co-existence of different service deployments by the same service provider. Thus, an incumbent system can be used for a first service, and an overlay system can be used for a second service. Moreover, spectrum use can be increased by using multiple protocols for the incumbent and overlay systems. In addition, dynamic channel sharing between the incumbent and overlay systems enables greater spectrum use and service deployment.

The present invention combines signals from the incumbent system with signals from the overlay system, thereby creating a single transmission. The incumbent and overlay signals are set at predefined negotiated transmission levels, including a frequency and power level, so that both the incumbent signal and the overlay signal can be transmitted and received with acceptable performance. For example, an MMDS incumbent signal can be overlaid with a CDMA overlay signal so that the MMDS signal can be modulated and demodulated within acceptable noise performance levels of the CDMA signal. The overlay signal can be spread across a wide spectrum, so that the spreading effect accounts for a negligible impact on the incumbent signal and the performance of both systems.

Because of the advancement of wireless communication systems, it is feasible to predict and attenuate the potential interference caused by overlay signals on incumbent signals and incumbent signals on overlay signals. This co-existence not only increases the spectral efficiency of scarce spectrum, but it also enables abstraction between service offerings by a single service provider.

Preferably, the present invention uses a medium access control (MAC) entity to monitor and control the dynamic channel sharing between the incumbent system and the overlay system. Real time updates and status of ongoing transmissions and resource allocations by the MAC entity help reduce the impact of reaction/response times when detecting if the incumbent system or the overlay system is idle or transmitting at low thresholds and responding by increasing transmission levels for the other system. In addition, the MAC entity can reduce or eliminate the near-far problem common to networks having channel access without centralized control. The MAC entity also may help cooperating entities, for example, in some instances by controlling power usage of each.

The present invention contemplates multiple architectures. For example, incumbent system customer provided equipment (CPE) can incorporate a transceiver for the overlay system. This architecture would enable multiple services to be delivered simultaneously over the incumbent system and the overlay system. For example, best effort services can be configured to be transmitted via the incumbent system, and guaranteed services can be configured to be transmitted via the overlay system. Other examples exist. In other architectures, CPE can incorporate only a transceiver for an overlay system. In this architecture, the overlay system uses all available spectrum resources in the absence of signals from the incumbent system. However, in this architecture, the overlay system is fully abstracted from the incumbent system.

The present invention uses complementary signals that are intentionally mixed. Thus, the incumbent signal is complementary to the overlay signal, and the two signals are overlaid to create a complementary transmission.

The use of the complementary signals is designed to reduce or eliminate problems with noise and interference that otherwise may exist. For example, the incumbent signal may have a specific power level and a frequency. In addition, the incumbent signal may have a certain noise level within its power and frequency range. The overlay signal can be overlaid on top of the incumbent signal at a viable power level and frequency such that it can be transmitted and received successfully. Prior systems do not intentionally mix signals. The prior systems only use multiple separate systems and different wireless spectrum.

Preferably, the mixing of the complementary signals is accomplished by dynamic channel sharing. In one embodiment, the dynamic channel sharing is achieved by sensing the power on channels used by the incumbent system. In one instance, the power sensing is achieved via input from the MAC entity. This method of using the MAC information for power sensing also reduces or eliminates the near-far problem that occurs in some communication systems and reduces reaction/response time delays for dynamically determining the channels to be shared by the incumbent system and the overlay system. Moreover, interference between the incumbent system and the overlay system is minimized due to the bandwidth spreading effect of the overlay system transceivers or receivers.

The present invention may be used with a wireless system. For example, the present invention may be used with television signals, two-way radios, wireless data signals, or another wireless systems. In addition, the present invention may be used for any spectrum, including licensed spectrum and unlicensed spectrum. Moreover, the present invention may be used for increased capacity, service deployment diversity, and/or other advances.

FIG. 1 depicts an exemplary embodiment of a communication system of the present invention. The communication system 102 of FIG. 1 comprises an incumbent system 104, an overlay system 106, and a multi-access controller 108. The incumbent system 104 and the overlay system 106 may communicate with a network device 110 and 112, respectively. Although, the incumbent system 104 and the overlay system 106 may communicate with the same network device or multiple network devices. The multi-access controller 108 may communicate via a network 114.

The incumbent system 104 may be configured to receive signals from, and transmit signals to, the multi-access controller 108 and the network device 110. When so configured, the incumbent system 104 receives signals from the network device 110, formats the signals according to a selected protocol, and transmits the formatted signals to the multi-access controller 108. Preferably, the incumbent system 104 is configured to format the signals according to protocols used for MMDS systems. The incumbent system 104 may be configured to encrypt, compress, or otherwise process a signal in accordance with a format or protocol for which the signal will be transmitted to the multi-access controller 108.

Preferably, the incumbent system 104 comprises a modulator configured to modulate the signals to be transmitted to the multi-access controller 108. More preferably, the incumbent system 104 comprises a modulator configured to modulate the signals according to protocols used for MMDS systems.

The incumbent system 104 may be configured to use a modulation technique. Preferably, the incumbent system 104 is configured to modulate the incumbent signal according to protocols used for single carrier systems, such as narrowband systems, including protocols for MMDS spectrum.

The incumbent system 104 formats signals received from the network device 110 as incumbent signals transmitted to the multi-access controller 108. The incumbent signals each have a transmission level, including a frequency and a power level. The transmission levels may be predefined, negotiated levels. Alternately the transmission levels may be set and/or changed dynamically according to control signals received by the multi-access controller 108. In either case, the incumbent signals are complementary to the overlay signals. The incumbent signals are formatted according to protocols used with incumbent systems, such as an MMDS system and a wireless communication system (WCS) system. These protocols will be referred to herein as incumbent protocols. Incumbent protocols used for formatting incumbent signals for wireless systems, such as an MMDS system and a WCS system, also may be referred to as wireless incumbent protocols.

The incumbent system 104 also may be configured to receive signals from the multi-access controller 108, process the signals, and transmit the signals to the network device 110. The incumbent system 104 is configured to process the signals to a format receivable by the network device 110 or another device. The incumbent system 104 may be configured to format the signals from a carrier band protocol, such as protocols used for MMDS spectrum, to a format receivable by the network device 110. The incumbent system 104 may be configured to de-encrypt, decompress, or otherwise process the signals so that they are receivable by the network device 110. The incumbent system 104 preferably is configured to receive a complementary signal from the multi-access controller 108 and to format the incumbent signal portion of the complementary signal for reception by a network device.

The incumbent system 104 may comprise a modulator configured to de-modulate signals received from the multi-access controller 108 prior to sending the signals to the network device 110. Preferably, the incumbent system 104 comprises a modulator configured to de-modulate MMDS signals so that they are receivable by the network device 110.

The incumbent system 104 may be configured with a variable power control mechanism. For example, the incumbent system 104 may be an MMDS system comprising a variable power control mechanism that can be used to dynamically obtain greater capacity for service deployment, such as best effort services or services requiring a minimum guaranteed capacity. In this example, an MMDS type incumbent system 104 can dynamically use a given channel of spectrum when the overlay system 106 is idle and not transmitting overlay signals.

The overlay system 106 may be configured to receive signals from, and transmit signals to, the multi-access controller 108 and the network device 112. When so configured, the overlay system 106 receives signals from the network device 112, formats the signals according to a selected protocol, and transmits the formatted signals to the multi-access controller 108. Preferably, the overlay system 106 is configured to format the signals according to protocols used for CDMA systems. The overlay system 106 may be configured to encrypt, compress, or otherwise process a signal in accordance with a format or protocol for which the signal will be transmitted to the multi-access controller 108.

Preferably, the overlay system 106 comprises a modulator configured to modulate the signals to be transmitted to the multi-access controller 108. More preferably, the overlay system 106 comprises a modulator configured to modulate the signals according to protocols used for CDMA systems.

The overlay system 106 may be configured to use a modulation technique. Preferably, the overlay system 106 is configured to modulate the overlay signal according to protocols used for wideband spread spectrum, such as protocols used for CDMA systems.

The overlay system 106 formats signals received from the network device 112 as overlay signals transmitted to the multi-access controller 108. The overlay signals each have a transmission level, including a frequency and a power level. The transmission levels may be predefined, negotiated levels. Alternately the transmission levels may be set and/or changed dynamically according to control signals received by the multi-access controller 108. In either case, the overlay signals are complementary to the incumbent signals. The overlay signals are formatted according to protocols used with overlay systems, such as a CDMA system, an orthogonal frequency division multiplexing (OFDM) system, and an ultra wide band (UWB) system. These protocols will be referred to herein as overlay protocols. Overlay protocols used for formatting overlay signals for wireless systems, such as a CDMA system, an OFDM system, and a UWB system, also may be referred to as wireless overlay protocols.

The overlay system 106 also may be configured to receive signals from the multi-access controller 108, process the signals, and transmit the signals to the network device 112. The overlay system 106 is configured to process the signals to a format receivable by the network device 112 or another device. The overlay system 106 may be configured to format the signals from a wideband protocol, such as protocols used for CDMA signals, to a format receivable by the network device 112. The overlay system 106 may be configured to de-encrypt, decompress, or otherwise process the signals so that they are receivable by the network device 112. The overlay system 106 preferably is configured to receive a complementary signal from the multi-access controller 108 and to format the overlay signal portion of the complementary signal for reception by a network device.

The overlay system 106 may comprise a modulator configured to de-modulate signals received from the multi-access controller 108 prior to sending the signals to the network device 112. Preferably, the overlay system 106 comprises a modulator configured to de-modulate CDMA signals so that they are receivable by the network device 112.

The overlay system 106 may be configured with a variable power control mechanism. For example, the overlay system 106 may be a CDMA system comprising a variable power control mechanism that can be used to dynamically obtain greater capacity for service deployment, such as best effort services or services requiring a minimum guaranteed capacity. In this example, a CDMA type overlay system 106 can dynamically use a given channel of spectrum when the incumbent system 104 is idle and not transmitting incumbent signals.

The transmission levels of the overlay signals are complementary to the transmission levels of the incumbent signals. The complementary transmission levels result in acceptable interference and performance for both the incumbent signals and the overlay signals, as explained more completely below. The complementary nature of the incumbent signals and the overlay signals enables them to co-exist in the same time and frequency domain.

The multi-access controller 108 may be configured to receive signals from, and/or transmit signals to, the incumbent system 104, the overlay system 106, and/or the network 114. The multi-access controller 108 is configured to receive an incumbent signal from the incumbent system 104 and an overlay signal from the overlay system 106. The multi-access controller 108 overlays the overlay signal on the incumbent signal to create a complementary signal that the multi-access controller transmits via the network 114. The multi-access controller 108 can overlay the signals using a selected process, method, or mechanism, such as mixing or otherwise combining the signals.

It will be appreciated that the multi-access controller 108 intentionally mixes or otherwise overlays the incumbent signal with the overlay signal to create the complementary signal. This enables the multi-access controller 108 to design around potential interference, using the respective transmission levels of the incumbent signal and the overlay signal to create the complementary signal.

In some instances, the multi-access controller 108 may be configured to format or otherwise process the complementary signal prior to transmitting it via the network 114, either before or after combining the incumbent signal and the overlay signal to create the complementary signal. For example, the multi-access controller 108 may encrypt, compress, or effect signal processing to the complementary signal prior to transmitting the complementary signal via the network 114.

In addition or alternately, the multi-access controller 108 may be configured to receive a complementary signal via the network 114. The multi-access controller 108 may be configured to transmit the complementary signal to the incumbent system 104 and the overlay system 106. In some instances, the multi-access controller 108 may be configured to format or otherwise process the complementary signal prior to transmitting it to the incumbent system 104 and the overlay system 106. For example, the multi-access controller 108 may de-encrypt, decompress, or effect signal processing to the complementary signal prior to transmitting the complementary signal to the incumbent system 104 and the overlay system 106.

In some embodiments, the multi-access controller 108 also may include a multi-access transceiver to separate the incumbent signal and the overlay signal from the complementary signal. The multi-access controller 108 then transmits the incumbent signal to the incumbent system 104 and transmits the overlay signal to the overlay system 106. The multi-access controller 108 can separate the incumbent signal and overlay signal from the complementary signal using a selected method, process, or mechanism, such as de-modulating the complementary signal into the incumbent signal and the overlay signal.

In the embodiments where the multi-access controller 108 includes a multi-access transceiver, it may be configured to receive and transmit signals configured according to a modulation technique, including modulation for protocols used for narrowband systems and wideband systems, such as MMDS systems and CDMA systems, respectively. The multi-access controller 108 may be configured to combine and/or split incumbent signals, overlay signals, and complementary signals, each possibly using one or more modulation techniques.

The multi-access controller 108 operates as a central controller and resource allocater. The multi-access controller 108 may be configured to overlay signals having predefined, negotiated transmission levels. Alternately, the multi-access controller can be configured to dynamically determine the transmission levels of one or more incumbent signals and/or overlay signals. Thus, the multi-access controller 108 can be configured to transmit control signals to the incumbent system 104 and the overlay system 106 identifying transmission levels for the respective systems or otherwise control the systems.

The multi-access controller 108 effects dynamic channel sharing between the incumbent system 104 and the overlay system 106. The dynamic channel sharing occurs as a result of overlaying the overlay signals on respective incumbent signals using the complementary transmission levels. This dynamic channel sharing between the incumbent system 104 and the overlay system 106 enables greater use of scarce spectrum, especially by dynamically allocating spectrum use to the overlay system 106 when the spectrum is not used by the incumbent system 104 and/or vice versa. Moreover, this dynamic channel sharing enables dynamic reallocation of spectrum for the incumbent system 104 and the overlay system 106 for best effort services or to augment services requiring a minimum guaranteed capacity.

The multi-access controller 108 determines what resources and transmission levels are used by the incumbent system 104 and the overlay system 106. When the multi-access controller 108 is dynamically allocating resources and transmission levels to the incumbent system 104 and the overlay system 106, the multi-access controller may be configured to use that information to extrapolate and select a desired resource and transmission level so that the signals may be overlaid.

The multi-access controller 108 may be configured to determine what protocols are used when a complementary signal is received, including the transmission levels of the respective incumbent signal and overlay signal. The multi-access controller 108 may transmit that information to the incumbent system 104 and/or the overlay system 106.

The multi-access controller 108 may comprise a carrier sensing system (CSS) to dynamically allocate the resources and transmission levels of the incumbent system 104 and the overlay system 106. The CSS determines the resources and transmission levels currently being used by storing or caching the system status, such as frequency, time slot, and power level, for the incumbent system 104 and the overlay system 106. The CSS also may sense and store whether the transmissions are regular or irregular, whether the signals are constant bit rate (CBR) or variable bit rate (VBR), or other characteristics of the signals and performance of the incumbent system 104 and the overlay system 106.

The CSS may comprise signal detection hardware or a medium access control (MAC) entity. Signal detection hardware senses the power levels on signals received from the incumbent system 104 and the overlay system 106 and generates control signals to effect changes or retain the same levels as needed. The MAC entity receives or obtains real time updates of the status of ongoing signals and resource allocations by the incumbent system 104 and the overlay system 106. Use of the MAC entity can reduce the impact of reaction/response times of signal detection hardware and eliminate or reduce the near-far problem common to networks with channel access not having centralized control.

On the receiving side, the CSS may be configured to determine the transmission levels of the complementary signal. It will be appreciated that the CSS may be configured to use one or more carrier sensing techniques, such as listen before talk, two-way family radio techniques, and IEEE 802.11 wireless local area network (LAN) techniques.

The multi-access controller 108 may be configured to transmit control signals to the incumbent system 104 and the overlay system 106. These control signals identify transmission levels to be used for incumbent signals and overlay signals, respectively. The control signals may require the incumbent system 104 or the overlay system 106 to raise or lower transmission levels or the output of incumbent signals and/or the overlay signals to the multi-access controller 108 based on the output of the opposing incumbent system 104 or overlay system 106, capacity needs, capacity availability, and other factors. Thus, the multi-access controller 108 synchronizes the needs and availabilities of the incumbent system 104 and the overlay system 106 and may use control signals to achieve those ends.

It will be appreciated that, in some embodiments, the multi-access controller 108 may include a transmitter only. In this configuration, the multi-access controller 108 will be able to receive incumbent signals from the incumbent system 104 and overlay signals from the overlay system 106, overlay the signals to create the complementary signal, and transmit the complementary signal via the network 114.

Alternately, in some embodiments, the multi-access controller 108 may include a receiver only. In this configuration, the multi-access controller 108 will be configured to receive a complementary signal via the network 114, transmit the complementary signal to the incumbent system 104, and transmit the complementary signal to the overlay system 106.

The network devices 110 and 112 are devices configured to receive signals from, and/or transmit signals to, the incumbent system 104 and/or the overlay system 106. The network devices 110 and 112 may be, for example, a telephone, a computer, a service hub, a transceiver, or another device configured to transmit signals to, or receive signals from, the incumbent system 104 and/or the overlay system 106.

The network 114 is a network configured to carry signals, such as complementary signals, to and from the multi-access controller 108. The network 114 may include hardware, software, or a combination thereof. For example, the network 114 may include wireless switches, antennas, receivers, transceivers, and/or other devices configured to handle signals.

Figure 2:
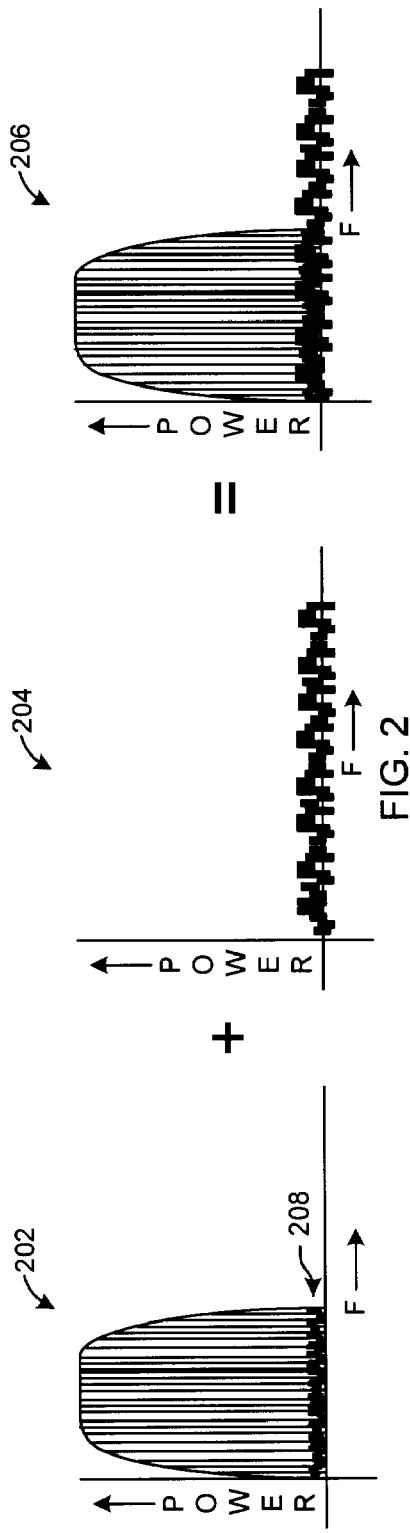
FIG. 2 is a diagram of a complementary signal for an incumbent signal and an overlay signal in accordance with an embodiment of the present invention.

FIG. 2 depicts an exemplary embodiment of an incumbent signal, an overlay signal, and a complementary signal. In the embodiment of FIG. 2, an incumbent signal 202 is overlaid with an overlay signal 204 to create a complementary signal 206.

The incumbent signal 202 has a frequency and a power level. In addition, the incumbent signal has a noise level 208. In this example, the incumbent signal is modulated as an MMDS signal.

The overlay signal 204 has a frequency and a power level. The power level of the overlay signal 204 can be configured to be above, below, and/or at the noise level 208 of the incumbent signal 202. Because the overlay signal 204 is modulated and demodulated as a wideband signal using spreading codes, it can be decoded at any level above, below, and/or at the noise level 208 of the incumbent signal 202. In this example, the overlay signal 204 is a CDMA signal with a power level encompassing than the noise level of the incumbent signal 206.

The spread spectrum characteristics of the CDMA signal, i.e. spreading a narrowband signal over a wideband width, enables the signal to have a power spectral density level in the range of thermal noise spectral density. Thus, when the incumbent signal 202 is overlaid with the overlay signal 204 to create the complementary signal 206, the impact of the spread spectrum CDMA signal to the narrowband MMDS signal is a negligible rise in the noise level. Since the CDMA signal has a negotiated transmission level, either predefined or specified by a control signal, splitting of the complementary signal and later demodulation of the MMDS signal and the CDMA signal occurs with acceptable performance. The spreading effect of the CDMA signal accounts for a negligible impact on the MMDS signal and a negligible impact of the MMDS signal on the CDMA signal.

The complementary nature of the complementary signal 206 can be seen from FIG. 2. Once the overlay signal 204 is combined with the incumbent signal 202, the two signals exist in a single complementary signal 206 in the same time and frequency domain. Thus, the intentional complementary mixing of the two signals results in the dynamic channel sharing between the incumbent system 104 and the overlay system 106.

The system of FIG. 1 operates as follows. In a first example, the incumbent system 104 has primary transmission rights, and the overlay system 106 has secondary rights. The multi-access controller 108 determines the transmission levels of the incumbent signals to be generated by the incumbent system 104. Then, the multi-access controller 108 determines the transmission levels of the overlay signals to be generated by the overlay system 106. In this example, the overlay system 106 is constrained to use transmission levels that result in acceptable interference for the incumbent system 104. The incumbent system 104 and the overlay system 106 then operate at these predefined, negotiated transmission levels.

The network device 110 transmits a signal to the incumbent system 104. The incumbent system 104 modulates the signal according to the transmission levels identified by the multi-access controller 108. The incumbent system 104 then transmits the modulated signal as the incumbent signal to the multi-access controller 108.

The network device 112 transmits a signal to the overlay system 106. The overlay system 106 modulates the signal according to the transmission levels identified by the multi-access controller 108. The incumbent system 106 then transmits the modulated signal as an overlay signal to the multi-access controller 108.

The multi-access controller 108 receives the incumbent signal from the incumbent system 104 and the overlay signal from the overlay system 106. In this example, the multi-access controller 108 mixes the incumbent signal with the overlay signal to create the complementary signal. The multi-access controller 108 then transmits the complementary signal over the network 114.

In this example, the incumbent signal is a narrowband signal and the overlay signal is a wideband spread spectrum signal. Thus, the complementary signal is an overlay of a wideband spread spectrum signal with a narrowband signal.

In another example, 1.25 megahertz (MHz) CDMA signals are used for operation in MMDS spectrum. In this example, the incumbent system 104 uses 6 MHz MMDS spectrum.

The incumbent system 104 generates incumbent signals using the 6 MHz spectrum. The overlay system 106 uses four 1.25 MHz CDMA channels to generate overlay signals. The multi-access controller 108 receives the incumbent signals modulated in the 6 MHz spectrum and receives the overlay signals modulated in the 1.25 MHz spectrum. The multi-access controller 108 overlays the 1.25 MHz overlay signals onto the 6 MHz incumbent signals, using the remaining 1 MHz for guard channels.

In another example, the incumbent system 104 is configured to modulate incumbent signals using 6 MHz spectrum. The overlay system 106 is configured to use 5 MHz CDMA signals. The incumbent system 104 generates incumbent signals to the multi-access controller 108 using the 6 MHz MMDS spectrum. The overlay system 106 generates overlay signals to the multi-access controller 108 using the 5 MHz wideband CDMA signals. The multi-access controller 108 receives the incumbent signals and the overlay signals. The multi-access controller 108 overlays the incumbent signal with the overlay signal, using the remaining 1 MHz for guard channels.

It will be appreciated that other overlay configurations may be used. The above overlay configurations are examples, and other frequencies and configurations may be used.

In another example, the multi-access controller 108 comprises a MAC entity. When the incumbent system 104 modulates a signal to create an incumbent signal, the MAC entity senses the transmission levels of the incumbent signal. Likewise, when the overlay system 106 modulates a signal received from the network device 112 to create an overlay signal, the MAC entity senses the transmission level of the overlay signal. The MAC entity uses the sensed transmission levels of the incumbent signal and overlay signal to confirm that the incumbent system 104 and the overlay system 106 are modulating the respective signals according to the pre-defined negotiated levels. In addition, the MAC entity uses the sensed transmission levels of the respective signals to mix the incumbent signal and the overlay signal to create the complementary signal.

In another example, the multi-access controller 108 comprises signal detection hardware. When the incumbent system 104 modulates a signal to create an incumbent signal, the signal detection hardware senses the transmission levels of the incumbent signal. Likewise, when the overlay system 106 modulates a signal received from the network device 112 to create an overlay signal, the signal detection hardware senses the transmission level of the overlay signal. The signal detection hardware uses the sensed transmission levels of the incumbent signal and overlay signal to confirm that the incumbent system 104 and the overlay system 106 are modulating the respective signals according to the pre-defined negotiated levels. In addition, the signal detection hardware uses the sensed transmission levels of the respective signals to mix the incumbent signal and the overlay signal to create the complementary signal.

In another example, the multi-access controller 108 comprises a MAC entity. In this example, the incumbent system 104 and the overlay system 106 provide real time updates of system status when a received signal is modulated or demodulated. Thus, for example, when the incumbent system 104 modulates a signal received from the network device 110 and transmits that modulated signal to the multi-access controller 108, a status signal is transmitted to the MAC entity. Likewise, when the overlay system 106 receives a signal from the network device 112 and modulates the signal to create the overlay signal, the overlay system transmits a status signal to the MAC entity. The status signals identify transmission levels and the overall system status of the incumbent system 104 and/or the overlay system 106, respectively.

In this example, the MAC entity uses the real time status to allocate resources and to identify transmission levels to be used by the incumbent system 104 and the overlay system 106. The MAC entity identifies the power level used by the incumbent system 104 and the power level used by the overlay system 106.

The multi-access controller 108 dynamically allocates the power levels to be used by the incumbent system 104 and the overlay system 106. The multi-access controller 108 entity transmits a control signal to the incumbent system 104 identifying the power level to be used by the incumbent system 104 when modulating a signal to create the incumbent signal. Likewise, the multi-access controller 108 transmits a control signal to the overlay system 106 identifying the power level to be used when modulating the signal received from the network device 112 to create the overlay signal. Thus, the MAC entity dynamically determines the channel sharing for the incumbent system 104 and the overlay system 106.

It will be appreciated that the MAC entity can identify the modulation scheme to be used by either the incumbent system 104 or the overlay system 106. In addition, the MAC entity can identify protocols to be used for a designated spectrum, frequency, power levels, digital processing, and/or whether spectrum is available for use by the incumbent system 104 and/or the overlay system 106. In this example, the MAC entity is configured to raise or lower transmission levels of signals formatted by the incumbent system 104 or the overlay system 106 depending on requirements of the other system. The MAC entity is configured to transmit control signals to the incumbent system 104 or the overlay system 106 to effect that formatting.

In another example, the multi-access controller 108 comprises a MAC entity. However, in this example the incumbent system 104 and the overlay system 106 do not transmit status signals to the MAC entity. Instead, the MAC entity monitors the incumbent system 104 and the overlay system 106. Thus, the MAC entity monitors modulation schemes and their respective transmission levels. The MAC entity then determines whether a modulation scheme, including transmission levels and other signal characteristics, should remain the same or are changed. Thus, the MAC entity dynamically determines the channel sharing for the incumbent system 104 and the overlay system 106.

In another example, the multi-access controller 108 receives a complementary signal. The multi-access controller 108 estimates the transmission levels of the complementary signal. The multi-access controller 108 transmits the complementary signal to the incumbent system 104 and to the overlay system 106.

The incumbent system 104 receives the complementary signal and demodulates the incumbent signal portion to yield a signal receivable by the network device 110. The incumbent system 104 then transmits the signal to the network device 110.

The overlay system 106 receives the complementary signal from the multi-access controller 108 and demodulates the overlay signal portion to yield a format receivable by the network device 112. The overlay system 106 then transmits the signal to the network device 112.

In another example, the multi-access controller 108 comprises a MAC entity. The multi-access controller 108 receives a complementary signal and transmits the complementary signal to the incumbent system 104 and the overlay system 106. In this instance, the multi-access controller 108 does not process the complementary signal.

The incumbent system 104 comprises a demodulator that demodulates the complementary signal. In this example, the incumbent system 104 demodulates only the incumbent signal portion of the complementary signal to yield a signal receivable by the network device 110. The rest of the complementary signal, including the overlay signal portion of the complementary signal, appears to the incumbent system 104 as noise or other interference. In other examples, the incumbent system 104 may otherwise process the signal after it is demodulated, such as with de-encryption or other signal processing.

The overlay system 106 comprises a demodulator that demodulates the complementary signal. In this example, the overlay system 106 demodulates only the overlay signal portion of the complementary signal to yield a signal receivable by the network device 112. The rest of the complementary signal, including the incumbent signal portion of the complementary signal, appears to the overlay system 106 as noise or other interference. In other examples, the overlay system 106 may otherwise process the signal after it is demodulated, such as with de-encryption or other signal processing.

In another example, the multi-access controller 108 comprises a MAC entity. The multi-access controller 108 receives a complementary signal via the network 114. The MAC entity determines the signal characteristics of the complementary signal, including the power level. The multi-access controller 108 transmits the complementary signal to the incumbent system 104 and the overlay signal to the overlay system 106. Additionally, the multi-access controller 108 transmits a control signal to the incumbent system 104 and the overlay system 106 identifying the signal characteristics of the complementary signal.

The incumbent system 104 receives the complementary signal and the control signal. The incumbent system uses the signal characteristics identified by the control signal to format the incumbent signal portion of the complementary signal into a signal receivable by the network device 110. In this example, the incumbent signal portion of the complementary signal is modulated with an incumbent protocol for the MMDS spectrum. In other examples, the signal characteristics may identify bandwidth, spreading codes, encryption, compression, or other processing characteristics.

The overlay system 106 receives the complementary signal and the control signal from the multi-access controller 108. The overlay system 106 uses the signal characteristics identified in the control signal to format the overlay signal portion of the complementary signal to a form receivable by the network device 112. In this example, the signal characteristics identify the incumbent signal portion of the complementary signal as having an incumbent protocol for a CDMA signal. In other examples, the signal characteristics may identify bandwidth, spreading codes, encryption, compression, or other processing characteristics.

In another example, the multi-access controller 108 comprises a MAC entity. In this example, the multi-access controller 108 does not transmit control signals to the incumbent system 104 and the overlay system 106. In this example, the MAC entity directly monitors and controls the incumbent system 104 and the overlay system 106.

The multi-access controller 108 receives a complementary signal over the network 114. The multi-access controller 108 transmits the complementary signal to the incumbent system 104 and to the overlay system 106.

The incumbent system 104 receives the complementary signal from the multi-access controller 108. The MAC entity identifies the signal characteristics of the complementary signal. The incumbent system 104 uses the signal characteristics of the complementary signal to format the complementary signal to a format receivable by the network device 110. In this example, the incumbent system 104 demodulates and de-encrypts the complementary signal to a form receivable by the network device 110.

The overlay system 106 receives the complementary signal from the multi-access controller 108. The MAC entity communicates the signal characteristics of the complementary signal to the overlay system 106. The overlay system uses the signal characteristics of the complementary signal to format the overlay signal to a form receivable by the network device 112. In this example, the overlay system demodulates and decompresses the complementary signal consistent with the signal characteristics to a format receivable by the network device 112.

Figure 3:
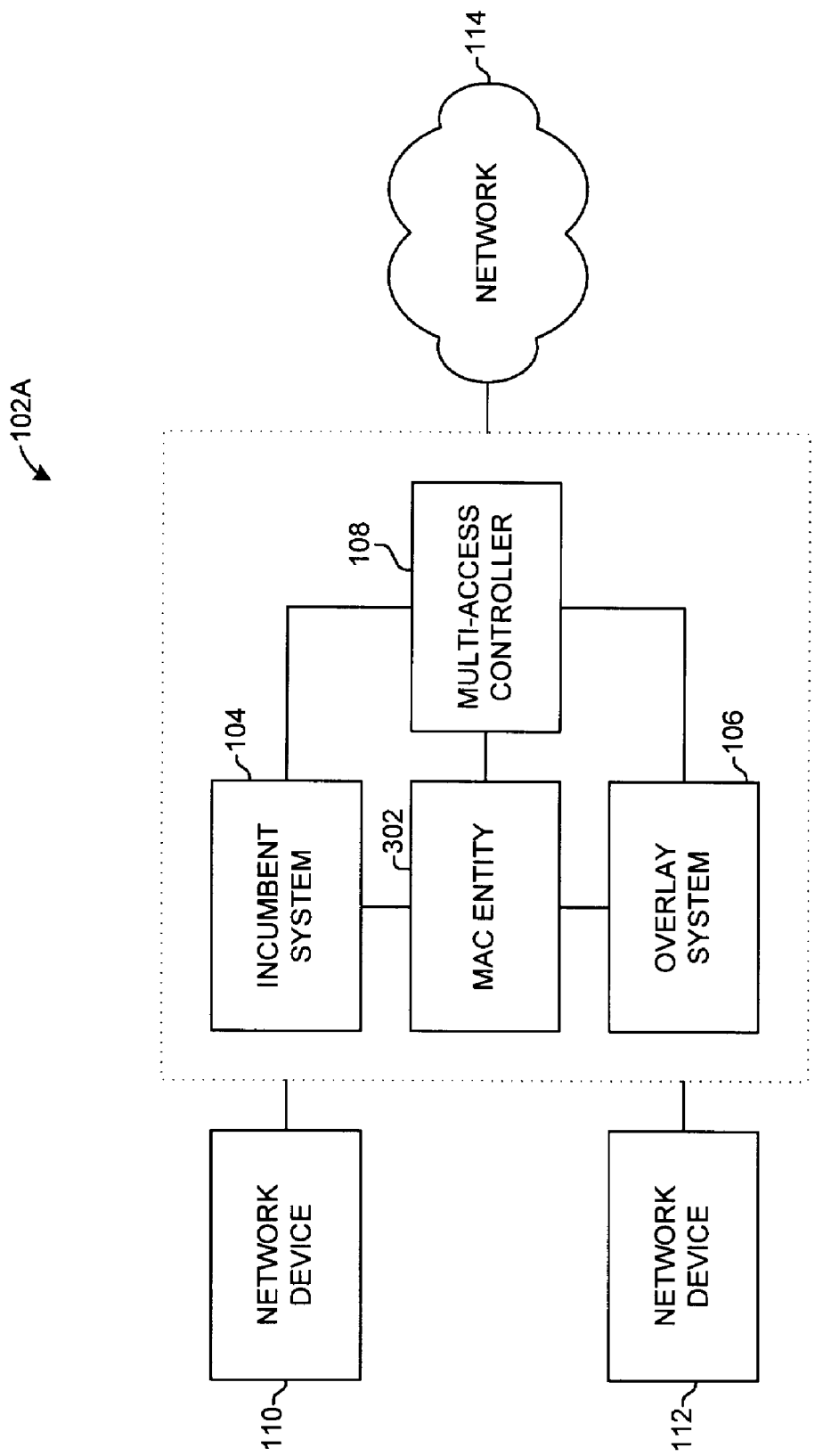
FIG. 3 is a block diagram of a communication system depicting a medium access control entity in accordance with an embodiment of the present invention.

FIG. 3 depicts an exemplary embodiment of another communication system 102A. In the embodiment of FIG. 3, the communication system 102A comprises a MAC entity 302. It will be appreciated that the incumbent system 104, the overlay system 106, the multi-access controller 108, and/or the MAC entity 302 may be co-located or distributed. Also, each may include one or more software or hardware components. For example, they may be in a single service hub or other device, or one or more components may be distributed in one or more separate devices. Moreover, as depicted in FIG. 3, the network device 110, the network device 112, and the network 114 may communicate with any of the incumbent system 104, the overlay system 106, and the multi-access controller 108. Moreover, other network devices may be included in the communication system 102A, or one or more of the network devices 110 or 112 may be eliminated from the communication system. The same is true for the communication system 102 of FIG. 1.

The MAC entity 302 monitors reception and transmission of signals to and from each of the incumbent system 104, the overlay system 106, and the multi-access controller 108. The MAC entity 302 monitors the signal characteristics of each signal transmitted or received. The signal characteristics may include bandwidth, spreading codes, modulation schemes, transmission levels, protocol formatting, and signal processing, such as encryption, de-encryption, compression, decompression, and other processing techniques. For example, the MAC entity 302 monitors and senses received power on signals received from the incumbent system 104 at the multi-access controller 108, signals received from the overlay system 106 at the multi-access controller, and signals received from the network 114 or other network device at the multi-access controller.

The MAC entity 302 may be configured to directly monitor and control signal characteristics, such as bandwidth, spreading codes, modulation schemes and transmission levels, of signals formatted at the incumbent system 104 and the overlay system 106. Alternately, the MAC entity 302 may be configured to transmit control signals to the incumbent system 104 or the overlay system 106. In addition, the MAC entity 302 may be configured to communicate monitored status or received status signals to the multi-access controller 108, and the multi-access controller 108 then may be configured to transmit control signals to the incumbent system 104 and the overlay system 106 or otherwise provide control.

The monitoring and control of the MAC entity 302 enables the multi-access controller 108 to combine incumbent signals and overlay signals and to identify signal characteristics for formatting received complementary signals. The MAC entity 302 generates real time status information of the incumbent system 104 and the overlay system 106 to the multi-access controller 108, either through direct communication or transmission and reception of status signals. Thus, the MAC entity 302 enables the multi-access controller 108 to dynamically control channel sharing on a real time basis.

In the embodiment of FIG. 3, the MAC entity 302 is depicted as separate from the multi-access controller 108. However, FIG. 3 depicts logical components for ease of understanding. The MAC entity 302 may be a part of the multi-access controller 108 or separate from the multi-access controller. Likewise, the MAC entity 302 may have multiple sub-MAC entities included in one or more of the incumbent system 104 and the overlay system 106.

The communication system 102A of FIG. 3 operates as follows. In a first example, the MAC entity 302 is a part of the multi-access controller 108. The network device 110 transmits a signal that is received by the overlay system 106, and the network device 112 transmits a signal that is received by the incumbent system 104. In this example, the network devices 110 and 112 are not directly connected to either of the incumbent system 104 or the overlay system 106, and intervening devices may route the signals to the respective incumbent system and overlay system. In this example, the signal from the network device 110 is a voice telephone call, and the signal from the network device 112 is multi-media Internet Protocol (IP) connection.

In this example, the protocols with which the signals are to be formatted, including their modulation schemes, are predefined and negotiated for each of the incumbent system 104 and the overlay system 106. The incumbent system 104 receives the signal generated from the network device 112, formats the signal according to an incumbent protocol to create an incumbent signal, and transmits the incumbent signal to the multi-access controller 108. The overlay system 106 receives the signal generated from the network device 110, formats the signal according to an overlay protocol to create an overlay signal, and transmits the overlay signal to the multi-access controller 108.

While the incumbent system 104 and the overlay system 106 are creating the respective incumbent signal and overlay signal, the MAC entity 302 monitors the incumbent system and overlay system to determine the signal characteristics of the incumbent signal and the overlay signal and to determine whether or not the incumbent system and overlay system are formatting signals according to the predefined negotiated levels for each system to create the respective incumbent signal and overlay signal. The MAC entity 302 passes the status to the multi-access controller 108. In this example, the status includes the system status of each of the incumbent system 104 and the overlay system 106 and the signal characteristics of each of the incumbent signal and the overlay signal.

The multi-access controller 108 receives the incumbent signal and the overlay signal and the status from the MAC entity. The multi-access controller 108 overlays the incumbent signal with the overlay signal to create a complementary signal. The multi-access controller 108 then transmits the complementary signal. In this example, the complementary signal is transmitted to the network 114.

In another example, the MAC entity 302 is separate from the multi-access controller 108. The MAC entity 302 communicates with the incumbent system 104, the overlay system 106, and the multi-access controller 108. The MAC entity 302 receives status signals from the incumbent system 104 and the overlay system 106. In this example, the status signals comprise system status and signal characteristics. In other examples, the status signals may include only the system status, only the signal characteristics, or other information. Additionally, in this example, the MAC entity 302 receives instructions from the multi-access controller 108 and generates instructions to the incumbent system 104 and the overlay system 106 based on those instructions. In other examples, the multi-access controller 108 generates control signals directly to the incumbent system 104 and the overlay system 106.

The MAC entity 302 receives a status signal from the incumbent system 104 and the overlay system 106. The MAC entity transmits the system status to the multi-access controller 108. The multi-access controller 108 determines that the power levels of the incumbent system 104 and the overlay system 106 should be modified. The multi-access controller 108 transmits the information identifying the power level for the incumbent system 104 and the power level for the overlay system 106 to the MAC entity 302. The MAC entity 302 transmits a control signal to the incumbent system 104 identifying the power level to be used for future incumbent signals. The MAC entity 302 also transmits a control signal to the overlay system 106 identifying the power levels to be used for future overlay signals.

The incumbent system 104 receives a signal and modulates the signal according to the power levels identified in the control signal from the MAC entity 302. The incumbent system 104 then transmits the modulated signal as an incumbent signal to the multi-access controller 108. The incumbent system 104 also transmits a status signal to the MAC entity 302 identifying the transmission levels of the incumbent signal, including the power level.

The overlay system 106 receives a signal and modulates the signal according to the power level identified in the control signal from the MAC entity 302. The overlay system 106 transmits the modulated signal as an overlay signal to the multi-access controller 108. Additionally, the overlay system 106 transmits a status signal to the MAC entity 302 identifying the transmission levels used for the overlay signal, including the power level.

The MAC entity 302 receives the status signal from the incumbent system 104 and the overlay system 106. The MAC entity 302 transmits the status to the multi-access controller 108.

The multi-access controller receives the incumbent signal, the overlay signal, and the status from the MAC entity 302. The multi-access controller 108 determines that the correct transmission levels were used for the modulation of the incumbent signal and overlay signal. The multi-access controller 108 mixes the incumbent signal and the overlay signal to create the complementary signal. The multi-access controller 108 transmits the complementary signal.

In another example, the overlay system 106 receives multiple signals for guaranteed services. The incumbent system 104 receives multiple signals for best effect services. The MAC entity 302 monitors both the incumbent system 104 and the overlay system 106 and determines that the overlay system received signals for guaranteed services. The MAC entity 302 instructs the multi-access controller 108 that signals for guaranteed services were received by the overlay system 106 and signals for best effort services were received by the incumbent system 104.

The multi-access controller 108 instructs the overlay system 106 to modulate the signals for transmission. The overlay system 106 modulates the signals, and transmits the signals to the multi-access controller 108. The multi-access controller overlays the signals as complementary signals for transmission.

In another example, the multi-access controller 108 receives a signal from the network 114. The MAC entity 302 monitors the signal and determines that it is a complementary signal. The MAC entity 302 determines the signal characteristics of the complementary signal and communicates the signal characteristics to the incumbent system 104 and the overlay system 106. The multi-access controller 108 also transmits the complementary signal to the incumbent system 104 and to the overlay system 106. In this example the MAC entity 302 is a part of the multi-access controller 108.

Figure 4:
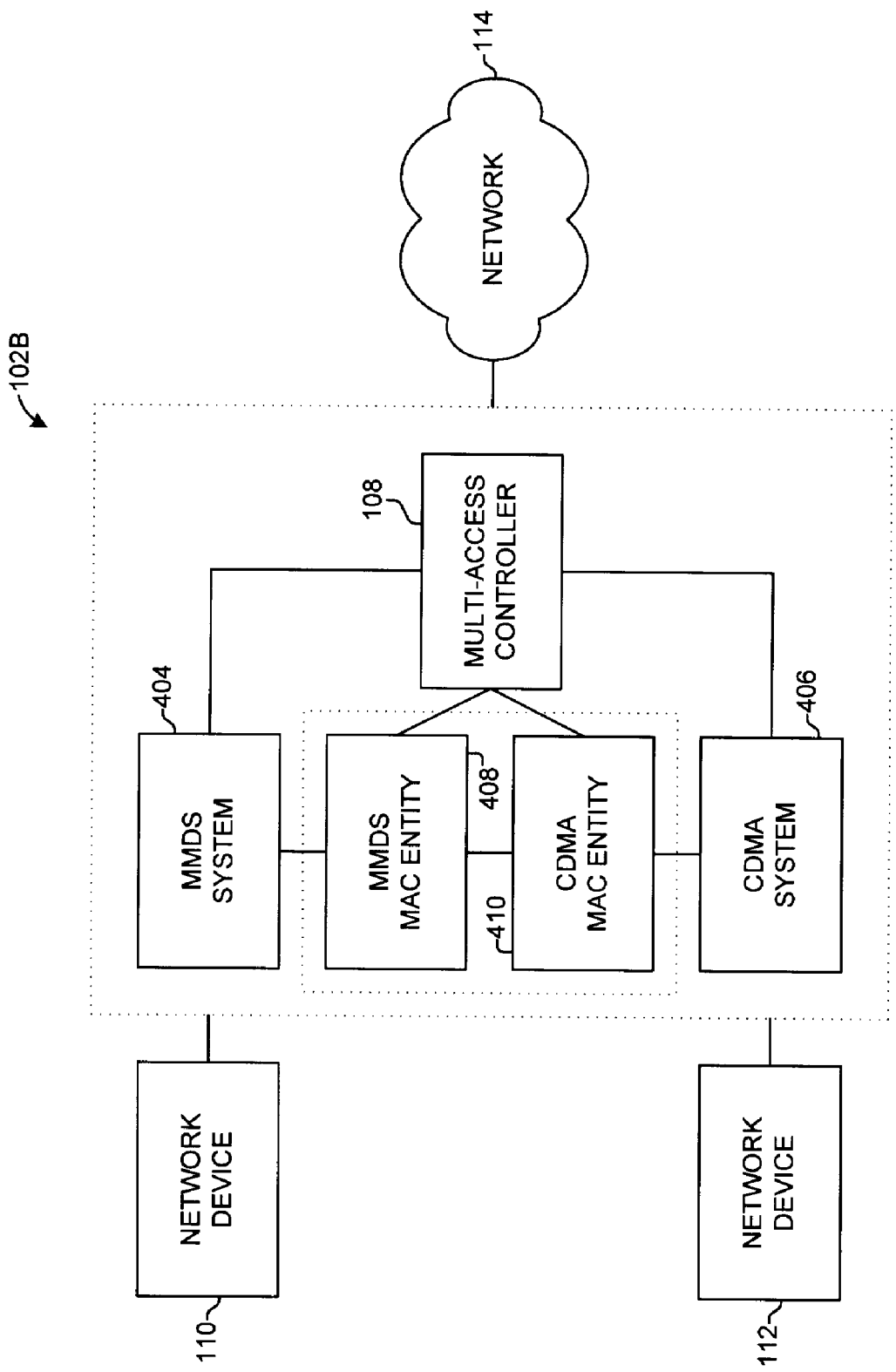
FIG. 4 is a block diagram of a communication system depicting multiple medium access control entities in accordance with an embodiment of the present invention.

FIG. 4 depicts an exemplary embodiment of a communication system 102B with multiple MAC entities. The communication system 102B comprises a multi-access controller 108 in communication with an MMDS system 404 and a CDMA system 406. In this example, the MAC entity 302A comprises an MMDS MAC entity 408 and a CDMA MAC entity 410.

The MMDS system 404 formats signals to be transmitted for protocols used with MMDS spectrum. These will be referred to herein as MMDS protocols. Preferably, the MMDS system 404 comprises a modulator configured to modulate signals to be transmitted according to required transmission levels. For the purposes of simplicity, the MMDS system 404 will be identified as generating incumbent signals. However, it will be appreciated that the MMDS system 404 can be configured as an overlay system in other configurations.

The CDMA system 406 formats signals to be transmitted according to protocols used with CDMA signals. For simplicity, these protocols will be referred to herein as CDMA protocols. Preferably, the CDMA system 406 comprises a modulator configured to modulate signals to be transmitted according to required transmission levels. For simplicity, the CDMA system 406 will be referred to as generating overlay signals. However, the CDMA system 406 can be referred to as an incumbent system in other embodiments.

The MMDS MAC entity 408 monitors signals received at, and transmitted from, the MMDS system 404. The MMDS MAC entity 408 transmits status to the multi-access controller 108 and the CDMA MAC entity 410 and receives status information from the CDMA MAC entity. Further, the MMDS MAC entity 408 receives control instructions from the multi-access controller 108.

The MMDS MAC entity 408 transmits control instructions to the MMDS system 404. Preferably, the MMDS MAC entity 408 is configured in the MMDS system 404. Alternately, the MMDS MAC entity 408 may be configured as a part of the multi-access controller 108 or as a separate MAC entity 302A separate from the MMDS system 404 and separate from the multi-access controller 108.

The CDMA MAC entity 410 monitors signals received at, and transmitted from, the CDMA system 406. The CDMA MAC entity 410 transmits status to the multi-access controller 108 and the MMDS MAC entity 408 and receives status information from the MMDS MAC entity. Further, the CDMA MAC entity 410 receives control instructions from the multi-access controller 108.

The CDMA MAC entity 410 transmits control instructions to the CDMA system 406. Preferably, the CDMA MAC entity 410 is configured in the CDMA system 406. Alternately, the CDMA MAC entity 410 may be configured as a part of the multi-access controller 108 or as a separate MAC entity 302A separate from the CDMA system 406 and separate from the multi-access controller 108.

In the embodiment of FIG. 4, the MMDS MAC entity 408 and the CDMA MAC entity 410 interface with each other and transmit status signals to each other. Likewise, the MMDS MAC entity 408 and the CDMA MAC entity 410 are in constant communication with the multi-access controller 108. In this manner, the multi-access controller 108, the MMDS MAC entity 408, and the CDMA MAC entity 410 operate together to determine and control signal formatting, including modulation and selection of transmission levels, for the MMDS system 404 and the CDMA system 406.

The system in FIG. 4 operates as follows. In a first example, the MMDS system 404 receives a first signal, and the CDMA system 406 receives a second signal. In this example, the transmission levels for incumbent signals and overlay signals are predefined negotiated levels.

The MMDS system 404 modulates the signals to be transmitted according to an MMDS protocol to create an incumbent signal. The MMDS system 404 transmits the incumbent signal to the multi-access controller 108. Concurrently, the MMDS MAC entity 408 monitors the modulation of the first signal by the MMDS system 404 to the incumbent signal. The MMDS MAC entity 408 transmits a status signal to the multi-access controller 108 identifying the signal characteristics of the incumbent signal, including the transmission levels.

The CMDA system 406 receives a second signal and modulates the second signal according to a CDMA protocol to create an overlay signal. The CDMA system 406 transmits the overlay signal to the multi-access controller 108. Concurrently, the CDMA MAC entity 410 monitors the modulation of the first signal to create the incumbent signal. The CDMA MAC entity 410 transmits a status signal to the multi-access controller 108 identifying the signal characteristics of the overlay signal, including the transmission levels.

In this example, the MMDS MAC entity 408 and the CDMA MAC entity 410 communicate with each other. Each transmits a status signal to the other identifying the signal characteristics of the respective incumbent signal and overlay signal.

The multi-access controller 108 receives the incumbent signal, the overlay signal, and the status signals. The multi-access controller 108 determines that the transmission levels of the incumbent signal and overlay signal are correct and overlays the incumbent signal with the overlay signal to create a complementary signal.

In another example, the multi-access controller 108 receives an incumbent signal from the MMDS system 404 and an overlay signal from the CDMA system 406. The multi-access controller 108 also receives a status signal from the MMDS MAC entity 408 and the CMDA MAC entity 410. The multi-access controller 108 determines that the power level used by the CDMA system 406 is not correct and transmits a control signal to the CDMA system requesting that the power level be changed and that the overlay signal be retransmitted to the multi-access controller. The CDMA system 406 reformats its received signal to create another overlay signal according to the correct transmission level. The CDMA system 406 then transmits the new overlay signal to the multi-access controller 108.

It will be appreciated that other examples exist. However, one skilled in the art can use the examples of operation described with respect to FIGS. 1 through 4 to determine alternative examples and operations for each of the embodiments.

Figure 5:
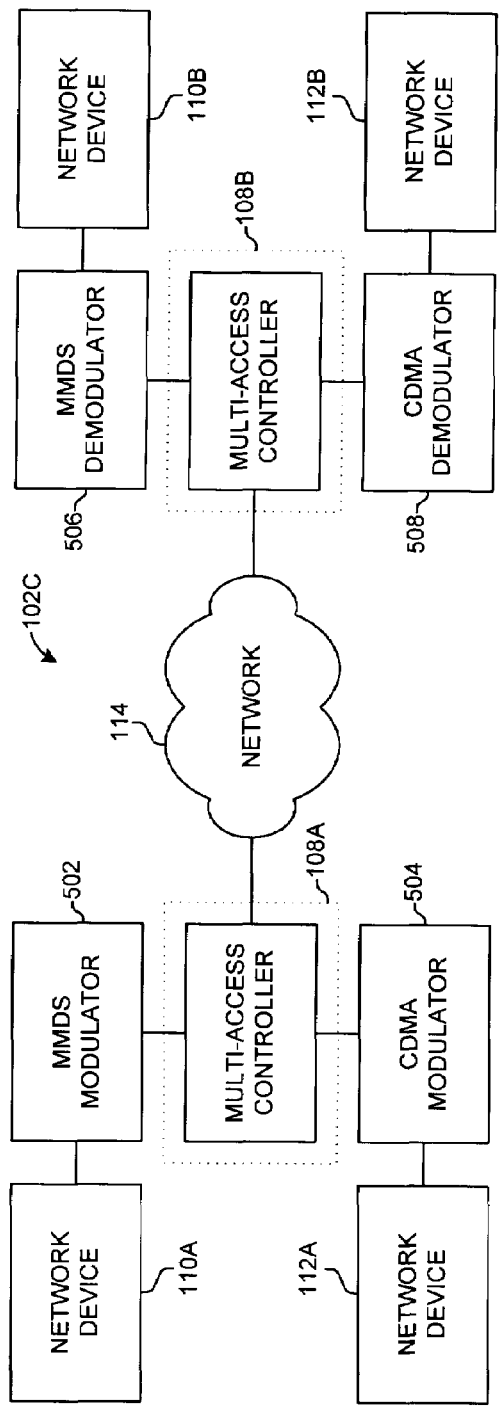
FIG. 5 is a block diagram of a communication system having an integrated transmitter and an integrated receiver in accordance with an embodiment of the present invention.

FIG. 5 depicts an exemplary embodiment of a communication system 102C identifying separate transmitters and receivers. The embodiment of FIG. 5 depicts downstream communications. The upstream portion of the communication system 102C comprises an MMDS modulator 502, a CDMA modulator 504, and a multi-access controller 108A. The downstream portion of the communication system 102C comprises an MMDS demodulator 506, a CDMA demodulator 508, and a multi-access controller 108B.

The MMDS modulator 502 receives signals from the network device 110A and modulates the signals according to protocols used with MMDS spectrum. The MMDS modulator 502 then transmits the MMDS modulated signals to the multi-access controller 108A as incumbent signals. The MMDS modulator 502 may be configured to provide other signal processing.

The CDMA modulator 504 receives signals from the network device 112A and modulates the signals according to protocols used for CDMA signals. The CDMA modulator 504 transmits the CDMA modulated signals to the multi-access controller 108A as overlay signals. The CDMA modulator 504 may be configured to provide other signal processing.

The multi-access controller 108A comprises only the upstream portion of the multi-access controller 108 described above. (See FIG. 1) The multi-access controller 108A overlays the incumbent signals with overlay signals as described above to create complementary signals. The multi-access controller transmits complementary signals over the network 114 as described above.

The multi-access controller 108B comprises only the downstream portion of the multi-access controller 108 described above. (See FIG. 1) The multi-access controller 108B receives a complementary signal. The multi-access controller 108B transmits the complementary signal to the MMDS demodulator 506 and the CDMA demodulator 508.

The MMDS demodulator 506 receives the complementary signal from the multi-access controller 108B, demodulates the complementary signal according to protocols used for MMDS spectrum demodulation, and transmits the demodulated signal to the network device 110B. The MMDS demodulator 506 may be configured to provide other signal processing.

The CDMA demodulator 508 receives the complementary signal from the multi-access controller 108B, demodulates the complementary signal according to protocols used for CDMA signals, and transmits the demodulated signals to the network device 112B. The CDMA demodulator 508 may be configured to provide other signal processing.

Figure 6:
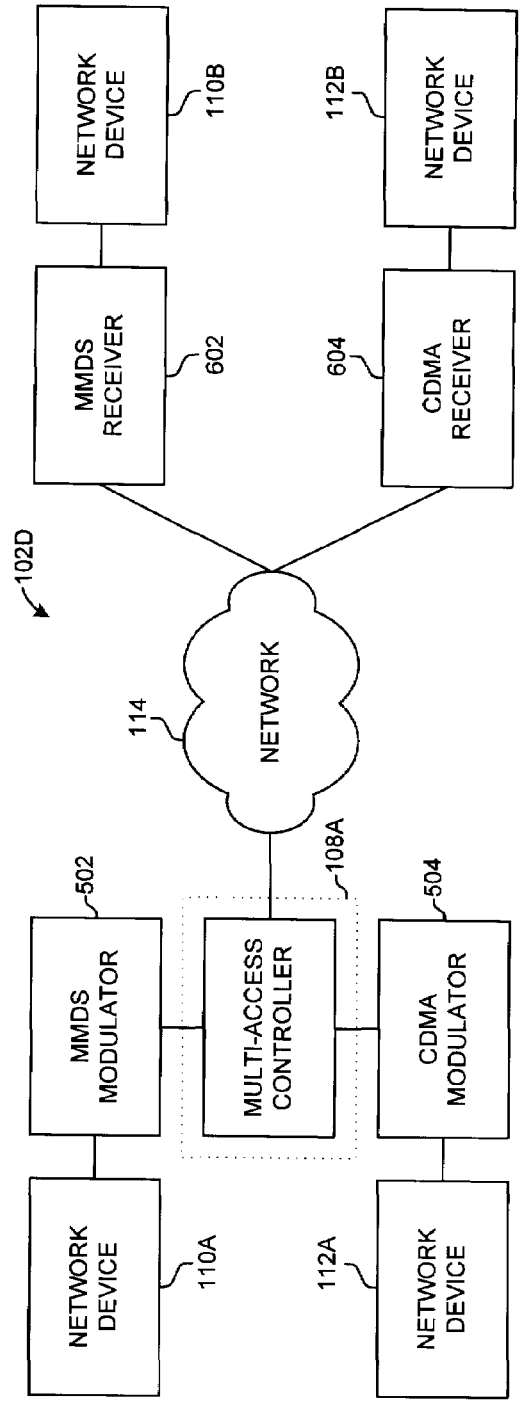
FIG. 6 is a block diagram of a communication system having an integrated transmitter in accordance with an embodiment of the present invention.

FIG. 6 depicts an exemplary embodiment of a communication system 102D in which the multi-access controller is not integrated. In the embodiment of FIG. 6, the communication system 102D comprises an MMDS receiver 602 and a CDMA receiver 604. The other components of the communication system 102D are the same as those depicted in the embodiment of FIG. 5.

The MMDS receiver 602 is configured to receive only the portion of a complementary signal that is formatted for protocols used with MMDS signals. Thus, the MMDS receiver 602 only will receive MMDS signals. To be consistent, these signals will be referred to herein as incumbent signals. The MMDS receiver 602 receives the incumbent signals and demodulates the incumbent signals or otherwise formats the incumbent signals as needed to be receivable by the network device 110B.

The CDMA receiver 604 is configured to receive only the portion of a complementary signal that is formatted for protocols used with CDMA signals. Thus, the CDMA receiver 604 only will receive CDMA signals. To be consistent, these signals will be referred to herein as overlay signals. The CDMA receiver 604 receives the overlay signals and demodulates the overlay signals or otherwise formats the overlay signals as needed to be receivable by the network device 112B.

Those skilled in the art will appreciate that variations from the specific embodiments disclosed above are contemplated by the invention. The invention should not be restricted to the above embodiments, but should be measured by the following claims.

What is claimed is:

1. A system for generating a wireless complementary signal comprising:
    an incumbent system configured to format a first signal according to an incumbent protocol;
    an overlay system configured to format a second signal according to an overlay protocol;
    a controller configured to overlay the first signal with the second signal to create the wireless complementary signal and to transmit the wireless complementary signal; and
    a MAC entity configured to generate at least one control signal to at least one member of a group consisting of the incumbent system identifying at least one transmission level for the first signal and the overlay system identifying at least one other transmission level for the second signal.

2. The system of claim 1 wherein the incumbent system is configured to format the first signal according to a protocol used for a multichannel multipoint distribution service system.

3. The system of claim 1 wherein the incumbent system comprises a modulator configured to modulate the first signal according to a protocol used for a narrowband sign.

4. The system of claim 1 wherein the overlay system is configured to format the second signal as a CDMA signal.

5. The system of claim 1 wherein the overlay system comprises a modulator configured to modulate the second signal according to a protocol used for a broadband signal.

6. The system of claim 1 further comprising a network device configured to transmit the first signal to the incumbent system.

7. The system of claim 1 wherein the incumbent system is configured to process the first signal using at least one other member of another group consisting of encryption, de-encryption, compression, decompression, coding, and decoding.

8. The system of claim 1 further comprising a network device configured to transmit the second signal to the overlay system.

9. The system of claim 1 wherein the overlay system is configured to process the second signal using at least one other member of another group consisting of encryption, de-encryption, compression, decompression, coding, and decoding.

10. The system of claim 1 wherein the controller is configured to transmit the at least one control signal to the incumbent system and, in response thereto, the incumbent system is configured to set the at least one transmission level for the first signal.

11. The system of claim 1 wherein the controller is configured to transmit the at least one control signal to the overlay system and, in response thereto, the overlay system is configured to set the at least one other transmission level for the second signal.

12. The system of claim 1 wherein:
the controller is configured to receive an incoming wireless complementary signal and to transmit the incoming wireless complementary signal to the incumbent system and to the overlay system, the wireless complementary signal comprising an incumbent signal portion and an overlay signal portion;
the incumbent system is configured to demodulate the incumbent signal portion; and
the overlay system is configured to demodulate the overlay signal portion.

13. The system of claim 12 further comprising a network device wherein the incumbent system comprises a modulator configured to demodulate the incumbent signal portion, to format the demodulated incumbent signal portion to a third signal receivable by the network device, and to transmit the third signal to the network device.

14. The system of claim 13 wherein the modulator is configured to demodulate the incumbent signal portion according to a protocol used for an MMDS system.

15. The system of claim 12 further comprising a network device wherein the overlay system comprises a modulator configured to demodulate the overlay signal portion, to format the demodulated overlay signal portion to a third signal receivable by the network device, and to transit the third signal to the network device.

16. The system of claim 15 wherein the modulator is configured to demodulate the overlay signal portion according to a protocol used for a CDMA system.

17. The system of claim 1 wherein the controller is configured to process the incoming wireless complementary signal using at least one other member of another group consisting of encryption, de-encryption, compression, decompression, coding, and decoding.

18. The system of claim 1 wherein the controller is configured to dynamically determine at least one complementary transmission level for at least one second member of a second group consisting of the first signal and the second signal.

19. The system of claim 18 wherein the complementary transmission level comprises at least one third member of a third group consisting of a power level, a frequency, and a time slot.

20. The system of claim 1 wherein the controller is configured to transmit a first control signal to the incumbent system identifying the at least one transmission level for the first signal and to transmit a second control signal to the overlay system identifying the at least one other transmission level for the second signal.

21. The system of claim 1 wherein the controller is configured to transmit a first control signal to the incumbent system identifying a first transmission level for a first new signal and to transmit a second control signal to the overlay system identifying a second transmission level for a second new signal.

22. The system of claim 1 further comprising a carrier sensing system configured to dynamically allocate at least one complementary transmission level for the first signal and the second signal.

23. The system of claim 1 wherein the MAC entity is configured to determine a status of the first signal and the second signal and to generate at least one second control signal to the incumbent system or the overlay system identifying at least one second transmission level for another signal.

24. The system of claim 1 wherein the incumbent system comprises a variable power controller configured to dynamically obtain capacity from the overlay system for transmission of another signal.

25. The system of claim 1 wherein the overlay system comprises a variable power controller configured to dynamically obtain capacity from the incumbent system for transmission of another signal.

26. A system for generating a wireless complementary signal comprising:
an incumbent system configured to format a first signal according to an incumbent protocol at a first transmission level and to generate the formatted first signal as an incumbent signal;
an overlay system configured to format a second signal according to an overlay protocol at a second transmission level and to generate the formatted second signal as an overlay signal;
a controller configured to overlay the incumbent signal with the overlay signal to create the wireless complementary signal and to transmit the wireless complementary signal; and
a MAC entity configured to determine the first transmission level for the incumbent signal and the second transmission level for the overlay signal, the first transmission level being complementary to the second transmission level.

27. The system of claim 26 wherein the MAC entity comprises a first MAC entity configured to determine the first transmission level and a second MAC entity configured to determine the second transmission level.

28. The system of claim 27 wherein the first MAC entity and the second MAC entity communicate to determine the first transmission level and the second transmission level.

29. The system of claim 27 wherein the first MAC entity is configured to monitor the incumbent system and to process at least one status signal from the second MAC entity to determine the first transmission level.

30. The system of claim 27 wherein the second MAC entity is configured to monitor the overlay system and to process at least one status signal from the first MAC entity to determine the second transmission level.

31. The system of claim 26 wherein the first transmission level comprises at least one member of a group consisting of a power level, a frequency, and a time slot.

32. The system of claim 26 wherein the second transmission level comprises at least one member of a group consisting of a power level, a frequency, and a time slot.

33. The system of claim 26 wherein the MAC entity is configured to generate a first control signal to the incumbent system identifying the first transmission level and to transmit a second control signal to the overlay system identifying the second transmission level.

34. The system of claim 26 wherein the incumbent system is configured to transmit a first status signal to the MAC entity, the overlay system is configured to transmit a second status signal to the MAC entity, and the MAC entity is configured to determine a third transmission level for at least one member of a group consisting of another incumbent signal and another overlay signal.

35. The system of claim 26 wherein the incumbent system is configured to transmit a first status signal to the MAC entity, the overlay system is configured to transmit a second status signal to the MAC entity, and, in response thereto, the MAC entity is configured to determine at least one member of a group consisting of the first transmission level and the second transmission level.

36. The system of claim 26 wherein the MAC entity is configured to monitor the incumbent system and the overlay system to determine a first status of the incumbent signal and a second status of the overlay signal.

37. The system of claim 26 wherein the incumbent system is configured to modulate the first signal as a narrowband signal, and the overlay system is configured to modulate the second signal as a wideband signal using at least one spreading code.

38. The system of claim 26 wherein the incumbent system comprises an MMDS system configured to modulate the first signal according to a protocol used for MMDS spectrum, and the overlay system comprises a CDMA system configured to modulate the second signal according to a protocol used for a CDMA signal.

39. The system of claim 26 wherein:
the controller is configured to receive an incoming wireless complementary signal and to transmit the incoming wireless complementary signal to the incumbent system and the overlay system, the wireless complementary signal comprising an incumbent signal portion and an overlay signal portion;
the incumbent system is configured to demodulate the incumbent signal portion; and
the overlay system is configured to demodulate the overlay signal portion.

40. The system of claim 39 wherein the MAC entity is configured to estimate at least one incoming transmission level of the incoming wireless complementary signal and to identify the at least one incoming transmission level to the incumbent system and the overlay system.

41. The system of claim 39 comprising a first network device and a second network device wherein the MAC entity is configured to determine signal characteristics of the incoming wireless complementary signal, the incumbent system is configured to use the signal characteristics to format the incumbent signal portion to a first format receivable by the first network device, and the overlay system is configured to use the signal characteristics to format the overlay signal portion to a second format receivable by the second network device.

42. The system of claim 41 wherein the signal characteristics comprise at least one member of a group consisting of bandwidth, a spreading code, a modulation scheme a frequency, a power level, a time slot, a protocol format, encryption, de-encryption, compression, decompression, coding, and decoding.

43. The system of claim 26 wherein the MAC entity is configured to monitor a first status of the incumbent system and a second status of the overlay system and to generate real time status information for the incumbent system and the overlay system to the controller.

44. The system of claim 26 wherein the incumbent system is configured to modulate the first signal at a first predefined, negotiated scheme, and the overlay system is configured to modulate the second signal at a second predefined, negotiated scheme.

45. The system of claim 26 wherein the incumbent system is configured to modulate the first signal at a first scheme dynamically identified by the controller, and the overlay system is configured to modulate the second signal at a second scheme dynamically identified by the controller.

46. A system of receiving a wireless complementary signal comprising:
a controller configured to receive the wireless complementary signal and to transmit the wireless complementary signal, the wireless complementary signal comprising an incumbent signal portion and an overlay signal portion;
an incumbent system configured to receive the wireless complementary signal from the controller and to demodulate the incumbent signal portion;
an overlay system configured to receive the wireless complementary signal from the controller and to demodulate the overlay signal portion; and
a MAC entity configured to estimate at least one transmission level of the wireless complementary signal and to identify the at least one transmission level to the incumbent system and the overlay system.

47. The system of claim 46 further comprising a network device wherein the incumbent system is configured to format the demodulated incumbent signal portion to a third signal receivable by the network device and to transmit the third signal to the network device.

48. The system of claim 46 wherein the incumbent system comprises a modulator configured to demodulate the incumbent signal portion according to a protocol used for an MMDS system.

49. The system of claim 46 further comprising a network device wherein the overlay system is configured to format the demodulated overlay signal portion to a third signal receivable by the network device and to transmit the third signal to the network device.

50. The system of claim 46 wherein the overlay system comprises a modulator configured to demodulate the incumbent signal portion according to a protocol used for a CDMA system.

51. The system of claim 46 further comprising a first network device and a second network device, wherein the MAC entity is configured to determine signal characteristics of the wireless complementary signal, wherein the incumbent system is configured to use the signal characteristics to format the incumbent signal portion to a first format receivable by the first network device, and wherein the overlay system is configured to use the signal characteristics to format the overlay signal portion to a second format receivable by the second network device.

52. The system of claim 51 wherein the signal characteristics comprise at least one member of a group consisting of bandwidth, a spreading code, a modulation scheme, a frequency, a power level, a time slot, a protocol format, encryption, de-encryption, compression, decompression, coding, and decoding.

53. A method for generating a wireless complementary signal comprising:
   formatting a first signal according to an incumbent protocol using an incumbent system;
   formatting a second signal according to an overlay protocol using an overlay system;
   overlaying the first signal with the second signal using a controller to create the wireless complementary signal;
   transmitting the wireless complementary signal; and
   transmitting a first control signal to the incumbent system identifying a first transmission level for the first signal and transmitting a second control signal to the overlay system identifying a second transmission level for the second signal.

54. The method of claim 53 further comprising formatting the first signal according to a protocol used for a multichannel multipoint distribution service system.

55. The method of claim 53 further comprising formatting the second signal as a CDMA signal.

56. The method of claim 53 further comprising transmitting the first signal from a network device.

57. The method of claim 53 further comprising processing the first signal using at least one member of a group consisting of encryption, de-encryption, compression, decompression, coding and decoding.

58. The method of claim 53 further comprising transmitting the second signal from a network device.

59. The method of claim 53 further comprising processing the second signal using at least one member of a group consisting of encryption, de-encryption, compression, decompression, coding and decoding.

60. The method of claim 53 further comprising transmitting the first control signal from the controller to the incumbent system and, in response thereto, setting the first transmission level for the first signal.

61. The method of claim 53 further comprising transmitting the second control signal from the controller to the overlay system and, in response thereto, setting the second transmission level for the second signal.

62. The method of claim 53 further comprising:
   receiving an incoming wireless complementary signal, the wireless complementary signal comprising an incumbent signal portion and an overlay signal portion;
   demodulating the incumbent signal portion using the incumbent system, and
   demodulating the overlay signal portion using the overlay system.

63. The method of claim 62 further comprising formatting the demodulated incumbent signal portion to a third signal receivable by a network device and transmitting the third signal to the network device.

64. The method of claim 62 further comprising demodulating the incumbent signal portion according to a protocol used for a multichannel multipoint distribution service system.

65. The method of claim 62 further comprising formatting the demodulated overlay signal portion to a third signal receivable by a network device and transmitting the third signal to the network device.

66. The method of claim 62 further comprising demodulating the overlay signal portion according to a protocol used for a CDMA system.

67. The method of claim 53 further comprising determining at least one complementary transmission level using a MAC entity for at least one member of a group consisting of the first signal and the second signal.

68. The method of claim 53 further comprising determining for the complementary transmission level at least one member of a group consisting of a power level, a frequency, and a time slot.

69. The method of claim 53 further comprising transmitting a first new control signal to the incumbent system identifying a first new transmission level for a first new signal and transmitting a second new control signal to the overlay system identifying a second new transmission level for a second new signal.

70. The method of claim 53 further comprising dynamically allocating at least one complementary transmission level for the first signal and the second signal using a carrier sensing system.

71. The method of claim 53 further comprising generating from a MAC entity the first control signal to the incumbent system identifying the first transmission level for the first signal or the second control signal to the overlay system identifying the second transmission level for the second signal.

72. The method of claim 53 further comprising determining a status of the first signal and the second signal using a MAC entity and generating the first control signal and the second control signal from the MAC entity.

73. The method of claim 53 further comprising dynamically obtaining capacity for the incumbent system from the overlay system for transmission of another signal.

74. The method of claim 53 further comprising dynamically obtaining capacity for the overlay system from the incumbent system for transmission of another signal.

75. A method for generating a wireless complementary signal comprising:
   formatting a first signal according to an incumbent protocol at a first transmission level using an incumbent system and generating the formatted first signal as an incumbent signal;
   formatting a second signal according to an overlay protocol at a second transmission level using an overlay system and generating the formatted second signal as an overlay signal;
   overlaying the incumbent signal with the overlay signal to create the wireless complementary signal using a controller and transmitting the wireless complementary signal; and
   determining the first transmission level for the incumbent signal and the second transmission level for the overlay signal using a MAC entity, the first transmission level being complementary to the second transmission level.

76. The method of claim 75 further comprising determining the first transmission level with a first MAC entity and determining the second transmission level with a second MAC entity.

77. The method of claim 76 further comprising monitoring the incumbent system using the first MAC entity and processing at least one status signal from the second MAC entity to determine the first transmission level.

78. The method of claim 76 further comprising monitoring the overlay system with the second MAC entity and processing at least one status signal from the first MAC entity to determine the second transmission level.

79. The method of claim 75 further comprising determining the first transmission level comprising at least one member of a group consisting of a power level, a frequency, and a time slot, and determining the second transmission level comprising at least one other member of another group consisting of another power level, another frequency, and another time slot.

80. The method of claim 75 further comprising generating a first control signal from the MAC entity to the incumbent system identifying the first transmission level and transmitting a second control signal from the MAC entity to the overlay system identifying the second transmission level.

81. The method of claim 75 further comprising transmitting a first status signal from the incumbent system to the MAC entity, transmitting a second control signal from the overlay system to the MAC entity, and determining a third transmission level at the MAC entity for at least one member of a group consisting of another incumbent signal and another overlay signal.

82. The method of claim 75 further comprising transmitting a first status signal from the incumbent system to the MAC entity, transmitting a second control signal from the overlay system to the MAC entity, and determining a third transmission level at the MAC entity for at least one member of a group consisting of the first transmission level and the second transmission level.

83. The method of claim 75 further comprising modulating the first signal as a narrowband signal and modulating the second signal as a wideband signal using at least one spreading code.

84. The method of claim 75 further comprising modulating the first signal according to a protocol used for a multichannel multipoint distribution service system and modulating the second signal according to a protocol used for a CDMA signal.

85. The method of claim 75 further comprising:
receiving an incoming wireless complementary signal and transmitting the incoming wireless complementary signal to the incumbent system and the overlay system, the wireless complementary signal comprising an incumbent signal portion and an overlay signal portion;
demodulating the incumbent signal portion at the incumbent system; and
demodulating the overlay signal portion at the overlay system.

86. The method of claim 85 further comprising estimating at the MAC entity at least one incoming transmission level of the incoming wireless complementary signal and identifying the at least one incoming transmission level to the incumbent system and the overlay system.

87. The method of claim 85 further comprising determining signal characteristics of the incoming wireless complementary signal, using the signal characteristics to format the incumbent signal portion to a first format receivable by a first network device, and using the signal characteristics to format the overlay signal portion to a second format receivable by a second network device.

88. The method of claim 87 further comprising determining signal characteristics comprising at least one member of a group consisting of bandwidth, a spreading code, a modulation scheme, a frequency, a power level, a time slot, a protocol format, encryption, de-encryption, compression, decompression, coding, and decoding.

89. The method of claim 75 further comprising modulating the first signal at a first predefined, negotiated scheme and modulating the second signal at a second predefined, negotiated scheme.

90. The method of claim 75 further comprising modulating the first signal at a first scheme dynamically identified by the controller and modulating the second signal at a second scheme dynamically identified by the controller.

91. A method for receiving a wireless complementary signal comprising:
receiving a wireless complementary signal at a controller and transmitting the wireless complementary signal, the wireless complementary signal comprising an incumbent signal portion and an overlay signal portion;
receiving the wireless complementary signal from the controller at an incumbent system and demodulating the incumbent signal portion;
receiving the wireless complementary signal from the controller at an overlay system and demodulating the overlay signal portion; and
estimating at least one transmission level of the wireless complementary signal using a MAC entity and identifying the at least one transmission level to the incumbent system and the overlay system.

92. The method of claim 91 further comprising formatting the demodulated incumbent signal portion to a third signal receivable by a network device and transmitting the third signal to the network device.

93. The method of claim 91 further comprising demodulating the incumbent signal portion according to a protocol used for an MMDS system.

94. The method of claim 91 further comprising formatting the demodulated overlay signal portion to a third signal receivable by a network device and transmitting the third signal to the network device.

95. The method of claim 91 further comprising demodulating the overlay signal portion according to a protocol used for a CDMA system.

96. The method of claim 91 further comprising determining signal characterstics of the wireless complementary signal using the MAC entity, using the signal characterstics to format the incumbent signal portion to a first format receivable by a first network device, and using the signal characteristics to format the overlay signal portion to a second format receivable by a second network device.

97. The method of claim 96 further comprising determining signal characterstics comprising at least one member of a group consisting of bandwidth, a spreading code, a modulation scheme, a frequency, a power level, a time slot, a protocol format, encryption, de-encryption, compression, decompression, coding, and decoding.

* * * * *